(12) United States Patent
Meretab (10) Patent No.: US 8,990,218 B2
(45) Date of Patent: *Mar. 24, 2015

(54) SYSTEM AND METHOD FOR DYNAMICALLY CONFIGURING CONTENT-DRIVEN RELATIONSHIPS AMONG DATA ELEMENTS

(75) Inventor: Efrem Meretab, Montclair, NJ (US)

(73) Assignee: MCAP Research LLC, Wilmington, DE (US)

( * ) Notice: Subject to any disclaimer, the term of this patent is extended or adjusted under 35 U.S.C. 154(b) by 174 days.

This patent is subject to a terminal disclaimer.

(21) Appl. No.: 13/527,928

(22) Filed: Jun. 20, 2012

(65) Prior Publication Data

US 2012/0265763 A1    Oct. 18, 2012

Related U.S. Application Data (63) Continuation of application No. 12/240,377, filed on Sep. 29, 2008, now Pat. No. 8,229,971.

(51) Int. Cl.
*G06F 17/30* (2006.01)
*G06F 17/27* (2006.01)

(52) U.S. Cl.
CPC ...... *G06F 17/30716* (2013.01); *G06F 17/2765* (2013.01); *G06F 17/30867* (2013.01)
USPC .......................................... 707/741; 707/802

(58) Field of Classification Search
CPC ............... G06F 17/30716; G06F 17/30991; G06F 17/30867
USPC ................. 707/729, 736, 802, 741
See application file for complete search history.

(56) References Cited

U.S. PATENT DOCUMENTS

| | | | |
|---|---|---|---|
| 5,241,671 | A | 8/1993 | Reed et al. |
| 5,351,189 | A | 9/1994 | Doi et al. |
| 6,915,300 | B1 | 7/2005 | Roux et al. |
| 6,924,828 | B1 | 8/2005 | Hirsch |
| 7,058,887 | B2 | 6/2006 | Cragun |
| 7,085,778 | B2 | 8/2006 | Reed et al. |
| 7,200,560 | B2 | 4/2007 | Philbert |
| 7,287,221 | B2 | 10/2007 | Bodin et al. |
| 7,315,867 | B2 | 1/2008 | Kobayashi et al. |
| 7,548,858 | B2 | 6/2009 | Wang |
| 7,664,773 | B2 | 2/2010 | Hattori et al. |
| 7,664,775 | B2 | 2/2010 | Reed et al. |
| 7,779,003 | B2 | 8/2010 | McKnight |
| 7,802,184 | B1 | 9/2010 | Baltilana |
| 7,954,044 | B2 | 5/2011 | Fischer et al. |
| 8,073,830 | B2 | 12/2011 | Fontes et al. |

(Continued)

OTHER PUBLICATIONS

Office Action mailed Jan. 4, 2011 in U.S. Appl. No. 12/240,377.

(Continued)

*Primary Examiner* — Shahid Alam
(74) *Attorney, Agent, or Firm* — K&L Gates LLP (57) ABSTRACT

A computer system configures data elements based on textual sources by identifying subunits of a textual source, indexing the subunits into a sequence comprised of terms, identifies based on a target a base subsequence of the sequence, and stores the terms in such a way that they can be expanded or contracted and a user can rapidly and efficiently derive relevant information and context even from a vast amount of information including by navigable display to the user. Other methods and systems of configuring and displaying data elements from textual sources are provided.

7 Claims, 8 Drawing Sheets

(56) References Cited

U.S. PATENT DOCUMENTS

| | | |
|---|---|---|
| 8,229,971 B2 | 7/2012 | Meretab |
| 2002/0128814 A1 | 9/2002 | Brandon et al. |
| 2005/0185225 A1 | 8/2005 | Brawn et al. |
| 2006/0106783 A1* | 5/2006 | Saffer et al. .................. 707/713 |
| 2007/0211071 A1 | 9/2007 | Slotznick et al. |
| 2007/0219933 A1 | 9/2007 | Datig |
| 2008/0148147 A1 | 6/2008 | Poston et al. |
| 2011/0016416 A1 | 1/2011 | Meretab |

OTHER PUBLICATIONS

Office Action mailed Apr. 21, 2011 in U.S. Appl. No. 12/240,377.
Office Action mailed Dec. 21, 2011 in U.S. Appl. No. 12/240,377.
Applicant Initiated Interview Summary mailed Jan. 30, 2012 in U.S. Appl. No. 12/240,377.
Notice of Allowance mailed Apr. 13, 2012 in U.S. Appl. No. 12/240,377.
Office Action mailed Sep. 17, 2012 in U.S. Appl. No. 12/839,131.
E. Bier et al., "A Document Corpus Browser for In-Depth Reading," JCDL '04, Tucson, AZ, 2004, pp. 87-96.
L. Good et al., "UC: A Fluid Interface for Personal Digital Libraries," JCDL '05, Denver, CO, 2005 10 pages.
Wang, Haoyl and Yang Huang, "Bondec—A Sentence Boundary Detector", published 2003, printed from nlp.stanford.edu/courses/cs224n/2003/fp/huangy/final_project.doc, 9 pages.
Walker et al., "Sentence Boundary Detection: A Comparison of Paradigms for Improving MT Quality", printed from http://www.mt-archive.info/MTS-2001-Walker.pdf, 2001, 4 pages.
Reynar, Jeffrey C and Adwait Ratnaparkhi, "A Maximum Entropy Approach to Identifying Sentence Boundaries", Computing Research Repository, printed from http://www.aclweb.org/anthology-new/A/A97/A97-1004.pdf, 1997, pp. 16-19.
Palmer, David D. and Marti A. Hearst, "Adaptive Sentence Boundary Disambiguation", UC Berkeley Computer Science Technical Report No. UCB/CSD-94/797, Feb. 1994, Computer Science Division (EECS), printed from http://www.eecs.berkeley.edu/Pubs/TechRpts/1994, 10 pages.
Lepro, Sara and Tim Paradis, "Stocks Rally Anew on More Signs of Economic Health", printed from http://finance.yahoo.com/news/Stocks-rally-anew-on-more-apt-791335492.html?x=0, Jul. 20, 2009, 1 page.
Office Action mailed Feb. 22, 2013 in U.S. Appl. No. 12/839,131.
Office Action mailed Aug. 30, 2013 in U.S. Appl. No. 12/839,131.
Office Action mailed Jan. 16, 2014 in U.S. Appl. No. 12/839,131.
Office Action mailed Jul. 31, 2014 in U.S. Appl. No. 12/839,131.

* cited by examiner

SYSTEM AND METHOD FOR DYNAMICALLY CONFIGURING CONTENT-DRIVEN RELATIONSHIPS AMONG DATA ELEMENTS

CROSS-REFERENCE TO RELATED APPLICATIONS/PRIORITY CLAIM

The present application is a continuation of and claims the benefit of priority to U.S. patent application Ser. No. 12/240,377, filed Sep. 29, 2008, the entirety of which is hereby incorporated by reference into the present application.

BACKGROUND

With the ever-growing diversity and number of information sources, each day brings more and more total information through which to sift. Our ability to identify and aggregate only the most relevant pieces information from diverse sources has not kept pace with the dramatic increase in the sheer volume of available information.

In addition, information may also be very time-sensitive, in which case prompt and systematic review of large volumes of information may be very difficult to achieve. Meanwhile, both the importance and value of this information drops steeply if it cannot be mined in a timely way. Accordingly, there is a need for locating relevant information from a volume of information in prompt, effective manner.

The task of targeting and aggregating small but specific chunks of information from within documents and across diverse sources presents the following challenges. First, the particular information of interest within a document is often surrounded by pages of dense prose, much of which may or may not be of interest. Second, the most relevant information may need to be extracted from across diverse sources and presented collectively so that it can be effectively examined. Third, the daunting problem of how much context to include for each extracted piece of information must be solved.

Digital reading systems have been developed that permit users to access diverse documents electronically by loading them into a digital workspace. This enables users to interact with documents electronically. However, merely facilitating the availability of documents in electronic form may help somewhat but brings its own potential for "information overload". It does not enable the user to rapidly "home in" on the topic of interest, and simultaneously creates the potential for "false leads" which waste time in follow-up.

In addition, there are particular difficulties when the user already has a collection of documents that may be deemed "equally" relevant—as by the mere return of results from a search—but is faced with time constraints, with seemingly repetitive information which in fact conceals subtle and important differences, and with the sheer volume of information.

In an effort to help address the issue of content comparison, document page retrieval systems have been developed which provide both keyword search and a zoom-in interface. In this approach, the process begins with a continuous tree-map visualization of a document collection. As the user types a search keyword, the view can be limited only to those documents that matched the query. The user can then zoom-in on a document and begin reading the page where the match is found. The user can then click on another document that had a match and zoom in on it and read it. Such concept is shown in "UC: A Fluid Interface for Personal Digital Libraries", and "A Document Corpus Browser for In-Depth Reading", which relate to interface systems.

While this approach provides some means for the comparison of content page-to-page, the method for aggregation of content is fixed (to pages) and inflexible (units of content cannot be altered). The method is fixed in that the user is presented with an entire page from a given source, even though the interest might be a single sentence on that page. The method is inflexible in that there is no mechanism to include/exclude appropriate relevant context. The user has to jump from one page to another page and cannot juxtapose only the relevant pieces of information from multiple sources. Also, relevant pieces of information may be imbedded in text that may not be relevant to cross-document comparability.

SUMMARY

The present invention discloses configuring relationships among data elements of a textual source to enable a user to locate relevant information from a volume of information in a prompt, efficient manner. The invention enables formatting and/or displaying the most directly relevant data elements from a collection of sources along with the most appropriate amount of context for data elements within the collection.

An example method according to the present invention may include identifying one or more subunits of a textual source, indexing the subunits to form a sequence comprised of one or more terms, identifying, based on a target, a base subsequence of the sequence, and storing the base subsequence in such a manner that it can be expanded by adding one or more terms, or contracted by omitting one or more terms.

An example method may also include deriving from the textual data sources one or more subunits by obtaining separable text boundaries, indexing the one or more subunits to form a sequence comprised of one or more terms, identifying, based on a target, a base subsequence of said sequence, and formatting the base subsequence in such a manner that a user is able to navigate through the terms of the base subsequence.

An example system according to the present invention is a computer-readable storage medium storing one or more subunits of a textual source which, when executed by one or more processors, causes the one or more processors to identify one or more subunits of the text-based source, to index the subunits to form a sequence comprised of one or more terms, to identify a base subsequence of the sequence, and to store the base subsequence in such a manner that it can be expanded by adding one or more terms or contracted by omitting one or more terms, and to format the base subsequence in such a manner as to permit the display thereof on a monitor.

An example apparatus according to the present invention discloses a means for storing a text-based document in a computer-readable medium, means for identifying one or more subunits of the text-based document, means for indexing the subunits to form a sequence comprised of one more terms, means for identifying, based on a target, a base subsequence of the sequence, means for storing the base subsequence in such a manner that it can be expanded by adding one or more terms, or contracted by omitting one or more terms, and means for formatting display of the base subsequence in such a way as to enable a user to navigate therein by expanding the amount of terms or contracting the amount of terms.

DRAWINGS

These and other features and advantages of the invention can be shown by way of illustrative examples, and not by way of limitation, shown in the following figures.

DETAILED DESCRIPTION

Figure 1:
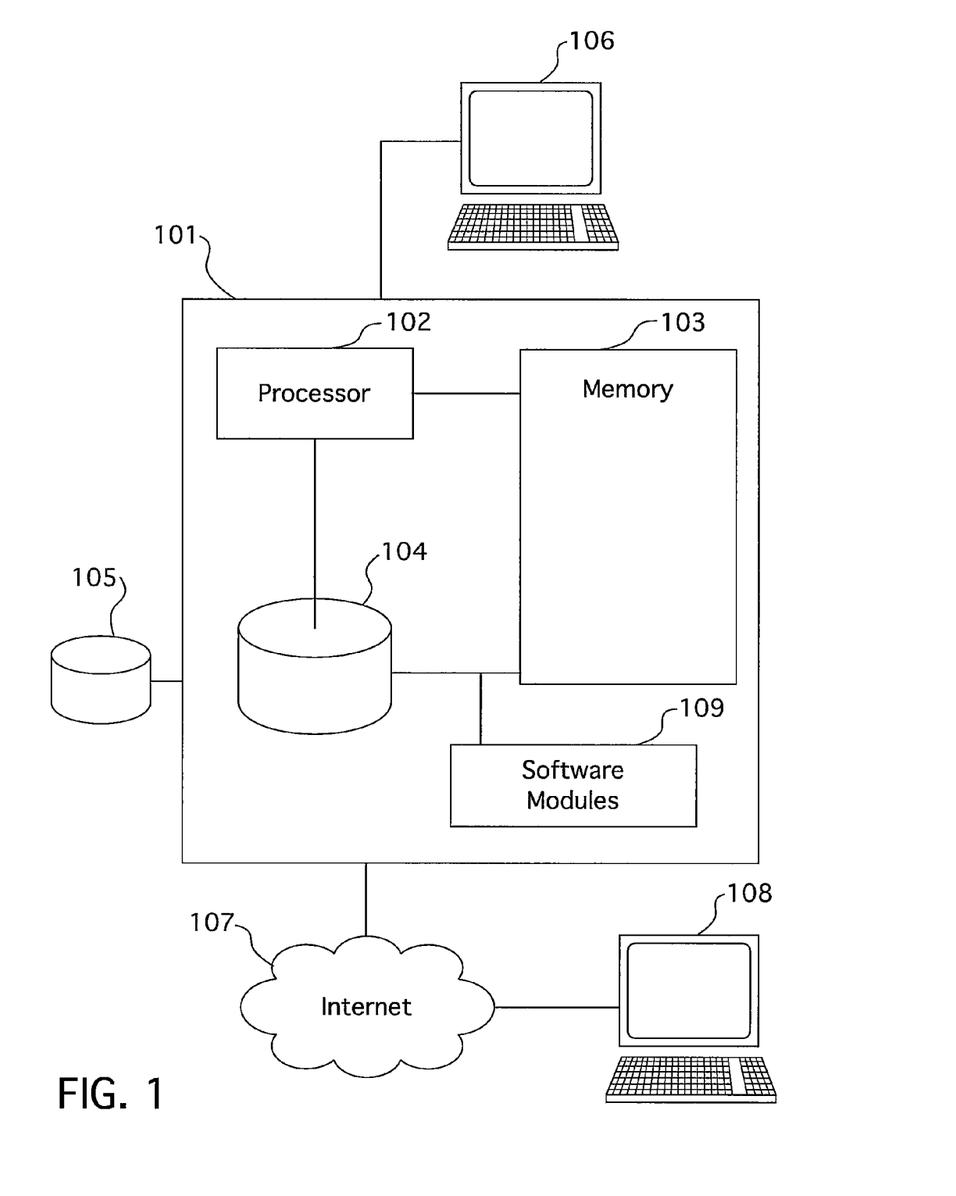
FIG. 1 shows a block diagram of a computer system by which the invention may be implemented.

FIG. 1 shows a block diagram of a computer system by which the present invention may be implemented. It will be recognized that one of skill in the art can employ multiple architectures, components and interconnections with which to carry out the present invention.

There is provided a configuration server 101 that can carry out numerous functions. It will be appreciated that there may be one or more electronically interconnected servers that carry out activities of configuration server 101, depending on the architecture and functionality desired. Further, configuration server 101 can comprise various modules for carrying out discrete computing tasks, and these modules may be located external to configuration server 101. Configuration server 101 comprises a processor 102, a memory 103 and a database 104 in which data, including text-based data, is stored. Again, there may be multiple processors, memories and databases in or associated with configuration server 101, and one or more of these, as the artisan will appreciate, may be located external to configuration server 101. For example, a database in which data is stored may be external database 105. Software modules 109 assist in carrying out the invention; as can be appreciated, given the modular nature of software implementation, the software may be provided within (or generally centralized within) configuration server 101, or may even be distributed proximate to or remote from it, in larger or smaller functional engines, as with cloud computing.

There is also provided a display 108 or a display 106 where a user, in electronic communication with configuration server 101, can view relevant processing activities on a display 108, 106 such as computer monitor. Display 106 may be architecturally proximate to configuration server 101, and a user may view configuration activities in such a manner. Or, a user at a display 108 can be in electronic communication with configuration server 101 where configuration information is transmitted from configuration server 101 through a network 107 such as the Internet. This would be the case for a user who is benefiting from the invention by Internet access, and may be via a PC, workstation or other device (such as a handheld) at work, at home, at an educational institution, and so on. In either instance—either where a user is architecturally proximate to the configuration server or communicates with it via the Internet—communication can flow in either direction, i.e., from the user toward the configuration server 101 and vice versa. Accordingly, FIG. 1 is illustrative only and the invention is not limited thereto.

Database 104 and/or database 105 may comprise a relational database. It may be based on another database model, such as object-oriented or hierarchical. These databases contain among other things textual data that is processed according to the present invention. By way of non-limiting example, database 104 may include the following tables. There may be a Document Table, and each record in this table contains information about a document. The fields in the table may include: unique Document ID (numeric, auto-incremented), original id or name provided by the source, file path (either the folder in the server or some URL), author, publisher's name, date published, and other domain specific metadata. There may be a Full-text Table, and this table stores text format of each original source document. Thus, PDF files are converted into text and stored in this table. The fields of this table may include: Document ID (same as in the Document Table), Full-text ID (numeric, auto-incremented), method of converting to text (manual, or some particular commercial software (e.g., easyPDF)), date when full text was created, and a field relating to the actual text. There may be a Master Sentence Table. As discussed elsewhere, a data element according to the present invention may be comprised of a sentence. Each sentence in every document may be stored in its own record. The fields in this table may include: Document ID, Full-text ID, Sentence Number (sequential integers starting with 1, within a given document), and a field for the actual sentence. Other fields may be included, e.g., paragraph number. There may be a Collection Table. To understand the purpose of this table, assume that the end user has a document library for a particular domain of applications. The end user may select a relatively small number of documents for further analysis. This subset is referred to as a collection. The end user might have created different collections for different purposes. The Collection Table stores information about these collections. The fields in this table include: Collection ID (auto-incremented), Collection Name, Creation Date, Query used to create the collection, etc. The Collection Documents Table may store information about the list of documents in each of the collections created by the user. The fields in this table may include: Collection ID, Document ID. Also, there may be Collection-Specific Sentence Tables. For each collection, there may be a table of data elements such as sentences. These sentences are the ones in the documents in the given collection. These tables may have identical structures as the Master Sentence Table; in that sense, they may be copies from the Master Sentence Table. Moving on, as for processor 102, it may be a general-purpose processor or customized.

The invention can be implemented on multiple platforms. A non-limiting example is by means of LAMP (Linux, Apache, MySQL, PHP/Perl). Further, JavaScript may be used to enhance navigation efficiencies. JavaScript may be attached to a navigational link on the web page. The JavaScript knows, from the web page, the displayed sentence's number and its document ID. From those inputs, JavaScript sends a request to retrieve prior/next sentences. On the server side, PHP or any other server-side programming language may be used to make database queries. Once the data is retrieved from the database, the server program prepares it for display and may build, e.g., an HTML page in response to the original request.

Each document in a collection of documents is segmented into distinct 'data elements'. The collection of stand-alone documents is thus converted to, and conceived of as, a collection of stand-alone data elements. In general, a data element is the smallest chunk of information that conveys a complete thought. As such, data elements may be sentences.

Full text search can thus be applied on individual data elements, and those that match can be retrieved as stand-alone entities. These sets of data elements may be displayed on a web page organized by the sources to which they belong. Placing them on a page 'side-by-side' allows direct comparison of the different sources' perspectives on that particular sub-topic of interest.

As a side note, it is important to contrast the retrieval of a collection of smaller chunks of information, i.e., data elements, with the common search engine goal of retrieving a collection of entire documents.

Some of the retrieved data elements, based on matching a search criteria, may convey sufficient information as stand-alone entities. Most of the time, however, a data element will require a range of surrounding sentences, or data elements, for appropriate context. Therefore, the set of criteria-matching data elements may be conceived as 'entry-points' for retrieving more complete information on the topic of interest.

Since the matching data elements serve as the most direct and optimal points of "entry" for reading or browsing information from across a collection of sources, the normal way of reading or browsing a collection of documents—one document at a time and top to bottom within each document—turns out to be a special case. When matching data elements are used as entry points, the user is no longer constrained by the rigid order of data elements in the source documents. The documents are 'disaggregated' into smaller chunks of information—building blocks—that can be reconfigured.

The invention is not limited to a collection of documents or sources. It may also be used for books that are electronically digitized. The book first needs to be segmented into data elements. The data elements may be sentences, subtitles, captions, charts, or figures. The different mentions of a topic in a book could be retrieved into a page, and those matches can be used as entry points to retrieve surrounding data elements for context, if needed.

There are a number of full text search technologies that may be used. They range from simple phrase, word, and even single character searches, to the use of more advanced tools such as 'regular expressions'. Regular expressions enable one to target very specific patterns of text in the data elements.

Further explication of a non-limiting embodiment is described hereinafter.

A data source, to be understandable to the human reader, can be considered as a text. A text, of course, can be on any topic—industry reports, an article, a book, etc. A text is comprised of units of information. These units of information vary in scope from the smallest datum to words, phrases, sentences, paragraphs, etc., to the entire text itself. In order for the reader to derive any value from a text, however, the text must first be accessed in a way useful to the reader.

Figure 2:
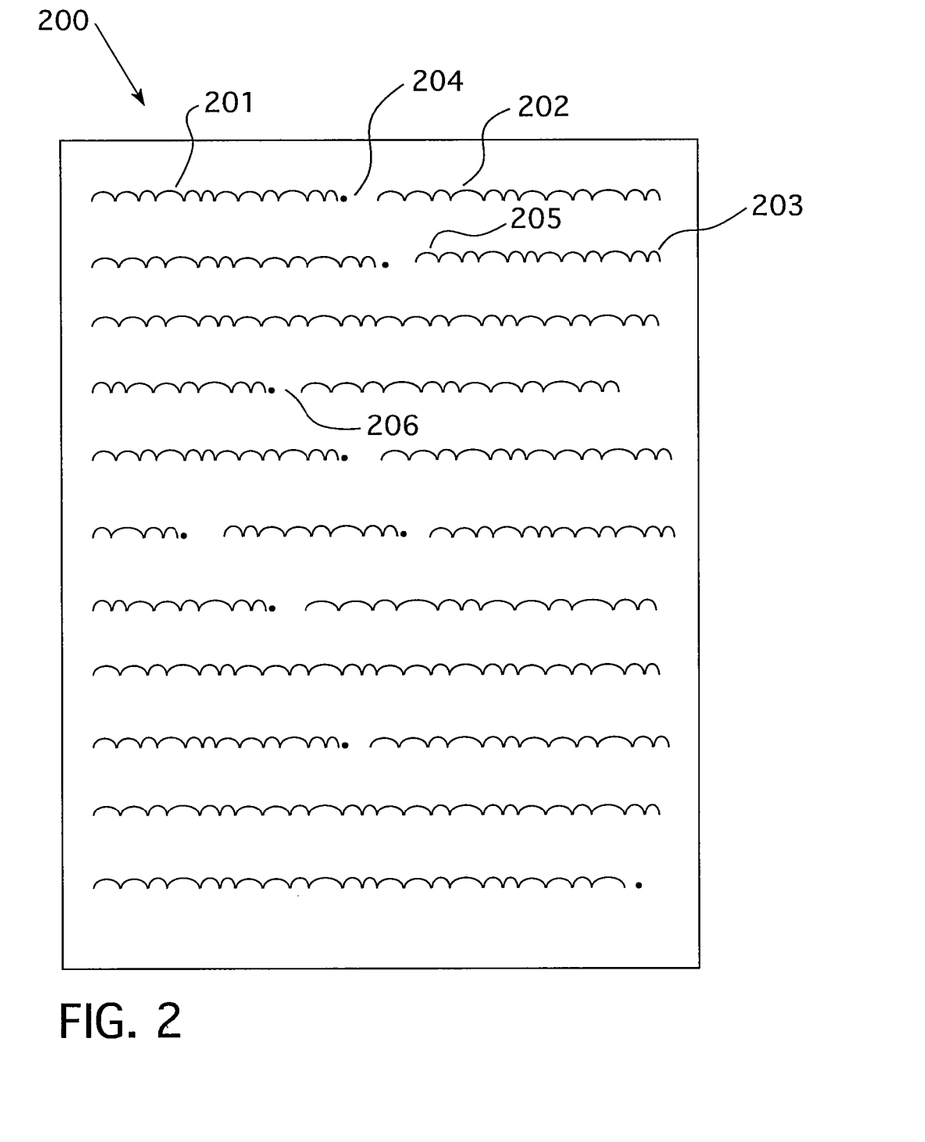
FIG. 2 shows an example of a source text containing information units.

With reference to FIG. 2, information units are identified in the source text. By way of non-limiting example, these may be sentences 201, 202, 203. The artisan will recognize that there are procedures that can be used to identify and disambiguate sentence boundaries in a text. An example of a rule would be: 'a period followed by a capitalized word signifies a sentence boundary', thus disambiguating the source text into sentences followed by periods 204, 205, 206, which of course is carried on throughout the text. There are exceptions to this rule. For instance, proper nouns that follow abbreviations such as Dr. or Mr. do not signify sentence boundaries. But rules can be designed to handle the exceptions also.

In a given text, sentences occur in series and the same sentence may repeat later in the text. In addition, the relative position of the sentences is critical—changing the relative positions of the sentences in a given text could change the message in the text. Thus, the stream of sentences in a text can be represented as a sequence, specifically "a sequence comprised of sentences."

Figure 3:
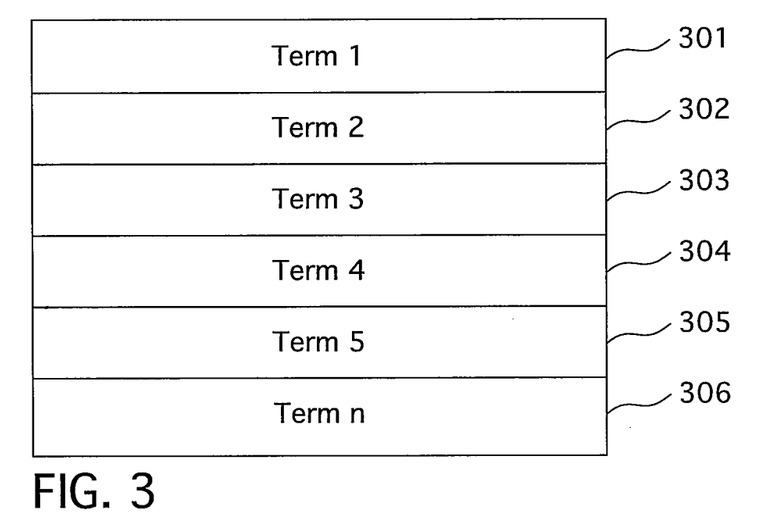
FIG. 3 shows an example of information subunits derived from a source text.

Mathematically, a sequence of length n is defined as a function from a set of consecutive integers (which is called the index set=$\{1, 2, 3, \ldots, n\}$) on to a set of objects. The indexed elements of a sequence are called terms. Thus, the sentences in a text form a sequence by simply numbering them consecutively, starting with the integer 1. The first term of the sequence is the first sentence, the second term of the sequence is the second sentence, etc., and the last term of the sequence is the last sentence of the text. In FIG. 3 are shown terms 301, 302, 303, 304, 305, and 306.

It is important to note that the indexed order does not change as a logical matter. In other words, the consecutive nature of the terms is preserved: Term 1 precedes Term 2, Term 2 precedes Term 3, and so on. The artisan will recognize that as a physical matter terms may be stored in various places in memory; however, as a logical matter, order should be derivable. Further, the term memory is interpreted as one or multiple memory units in communication. Thus, the invention is carried out with the assistance of a computer-readable medium such as a computer memory in which may be stored data elements such as subunits of a textual source, a sequence(s) obtained by indexing the subunits, a base subsequence(s), and also an expanded sequence or contracted subsequence. As one of skill can appreciate, with respect to the options for using centralized and/or distributed memory storage and processing, the memory unit(s) employed according to the present invention may be one memory device or multiple storage devices logically or physically proximate to each other, or even remote, so long as they can intercommunicate to carry out the present invention. Thus, the computer memory described with reference to the invention is not necessarily a unitary device—i.e., it is not necessarily one memory unit—but rather can be multiple memory units in electronic communication, wherever located.

Each data element may be stored in a database. Then database queries can be applied in order to retrieve matching 'records' of data elements. One way to store information about the relative order of data elements within a document is to associate a composite key which each data element reflects: a unique id for the document plus an integer index that indicates the sequential position of a data element within that document.

For any given sequence (Term 1, Term 2, Term 3, ..., Term n), a subsequence may be generated by taking one or more of the terms in the given sequence. The relative position of the terms selected must be preserved. For instance, a subsequence may be generated from the above text by taking the first term, then the third, and then the fifth term, thus creating a subsequence of length 3 (i.e., length of a subsequence=total number of terms in the subsequence).

Figure 4:
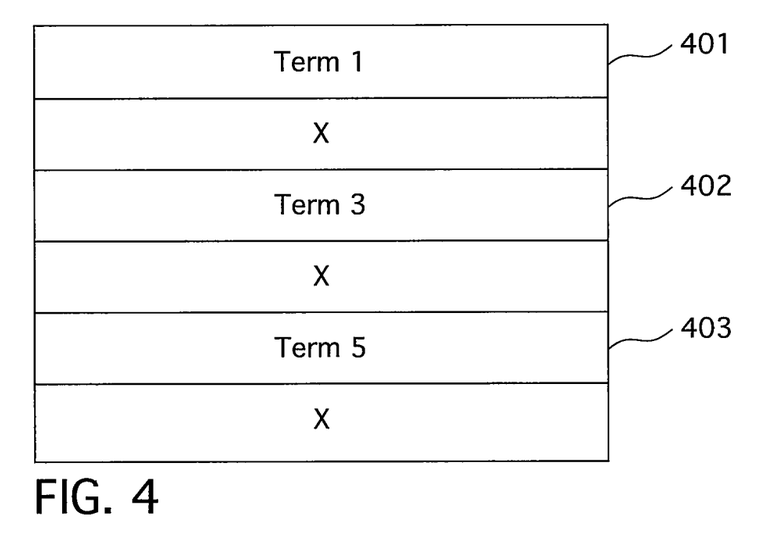
FIG. 4 shows an example of how information subunits derived from a source text can be configured.

Notice that the first term in the original sequence is the first term of the subsequence; the third term in the original sequence becomes the second term of the subsequence; and the fifth term of the original sequence becomes the third term of the subsequence. Thus, in FIG. 4, we have a three-element base subsequence 401, 402, 403, so named because it forms the base of further processing.

Any number of terms may be selected to generate a subsequence of the original sequence. A single term may be selected; two terms or three terms, and up to n, if there are n terms in the original sequence. In fact, there are 2 to the power of n, or $2^n$, possible subsequences, for sequences (Term 1, Term 2, Term 3, ..., Term n).

Total Ordering Versus Partial Ordering

It should be noted that within a document there is a first sentence, a second sentence, a third sentence, etc., and a last sentence. This is called total ordering. However, there is no natural order between sentences from different documents. We cannot say that the first sentence from one document precedes the first sentence from another document. Therefore, the set of all data elements from the collection of documents forms what is mathematically called "partial ordering."

We point out this because for our purpose we may introduce a "total order" into the collection of all the data elements by defining a global index. For instance, we can introduce an ordered pair of integers to index the data elements: (j, k). The first element, j, would index the documents in the collection and the second integer, k, would index the sentences within each document. The ordering of the data elements within each document is strict as imposed by the source document, but the ordering of the documents can be re-defined by the user.

Base Subsequences

Now base subsequences are discussed. A base subsequence is so named because it is a subsequence whose terms are selected on the basis of their meeting specific criteria and which form the base for further processing. A base subsequence is determined on the basis that its terms match a search criteria. In other words, if a term in the original sequence matches search criteria, that term will be selected to be a term in the base subsequence.

Figure 5:
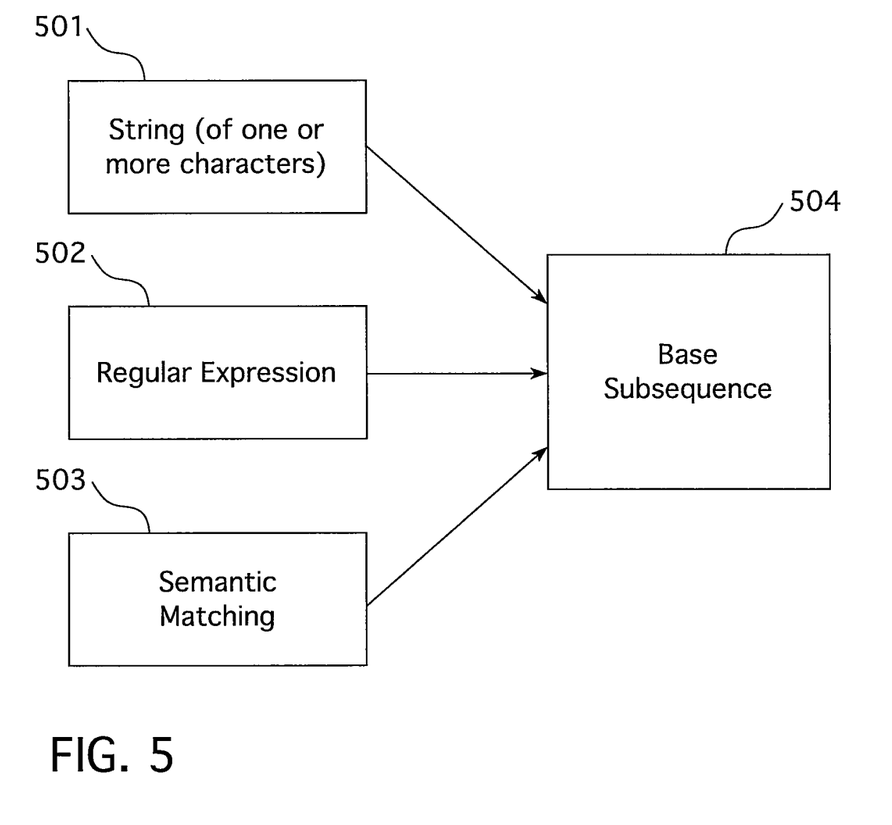
FIG. 5 shows an example of certain search criteria that can be utilized to result in source text configuration.

Now search criteria are described. The terms in the sequence may be the sentences from the text. As such, a full text search can be applied on each of the terms. In an example implementation, as seen in FIG. 5, the system searches for terms that match the string of characters input by the user. The string of characters may denote a phrase, word, or even a single character (e.g., "$") 501. All the terms that match the input string of characters are selected to form the base subsequence 504.

The system may utilize more advanced, but well established, search capabilities that enable users to express their search criteria more precisely. For example a search algorithm that can handle Boolean operators (for example, "sales" AND "revenues" NOT "earnings") can dramatically increase the precision of standard full text search. Search algorithms based on "regular expression" are by far the most powerful in specifying conditions with great precision 502.

Finally, the latest development in search engine technologies is the so called "semantic search" 503. These technologies seek to find matches based on the meaning of words rather than on matching a string of characters.

Display of Retrieved Matching Results

Figure 6A:
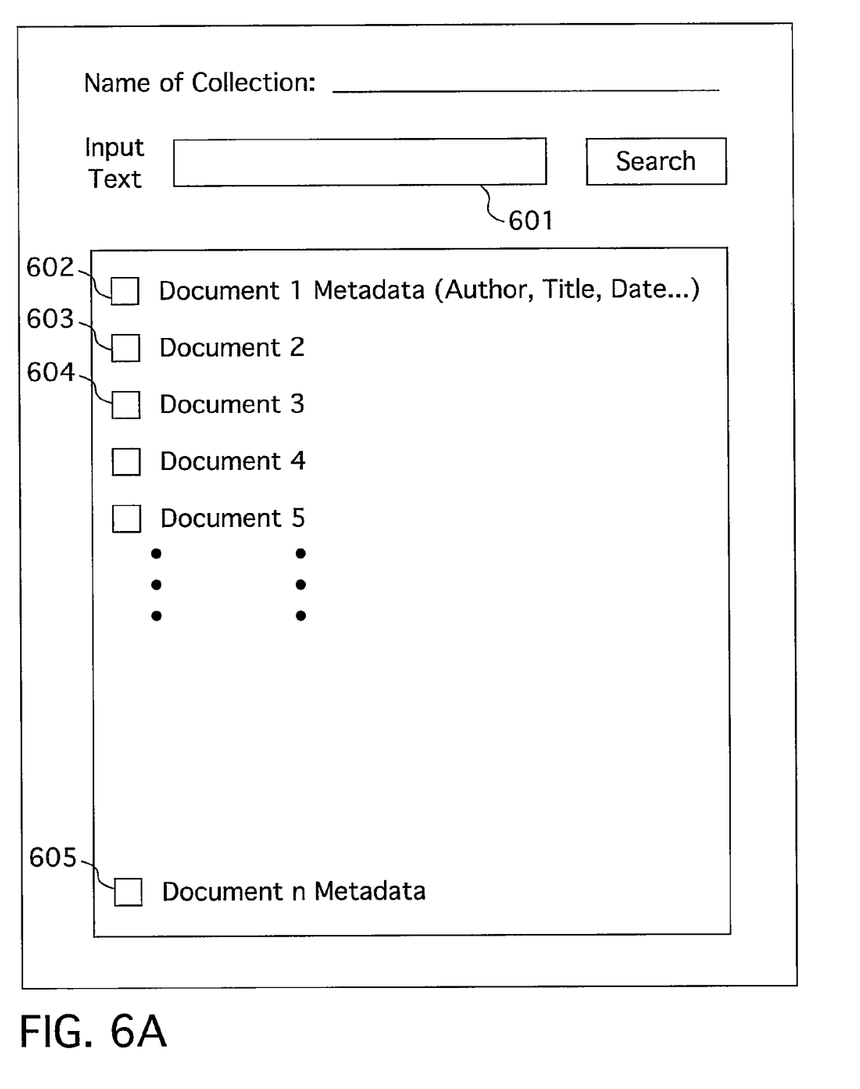
FIG. 6A shows an example of a display depicting a text input box, and a search button and added information.
Figure 6B:
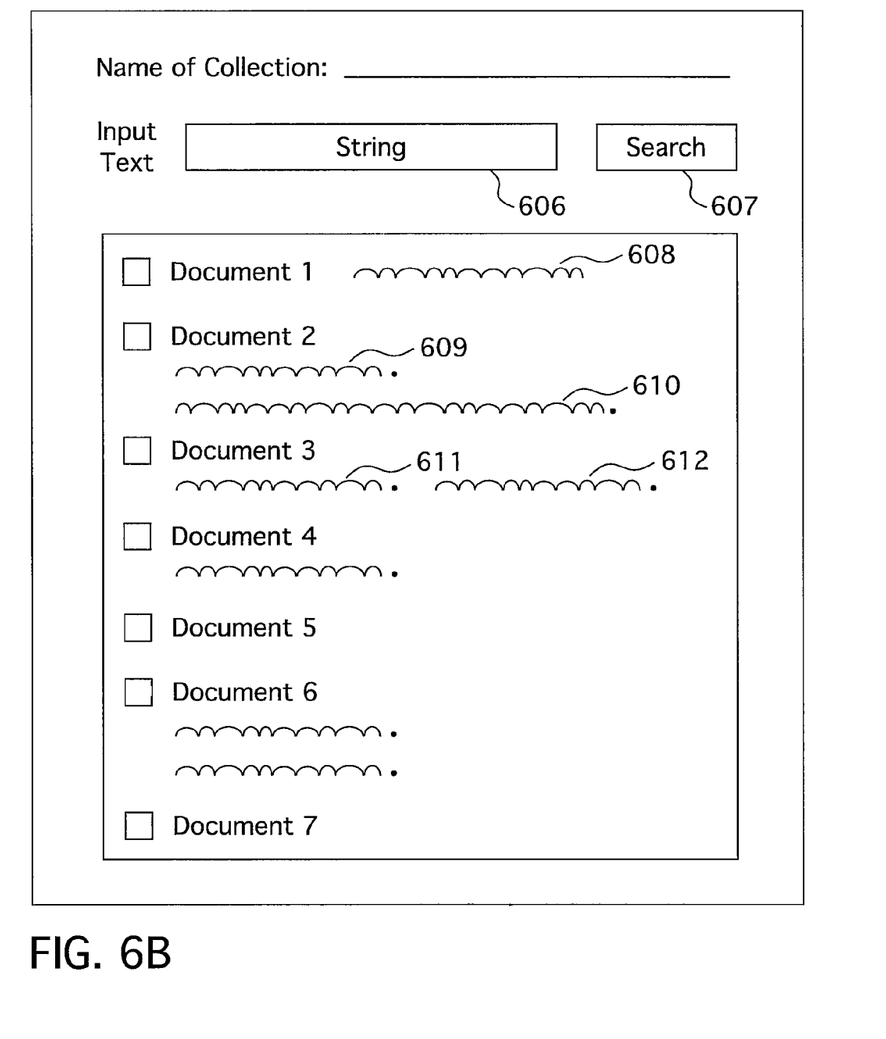
FIG. 6B shows an example of a screen depicting the entry of a search query in a text input box, and added information.
Figure 6C:
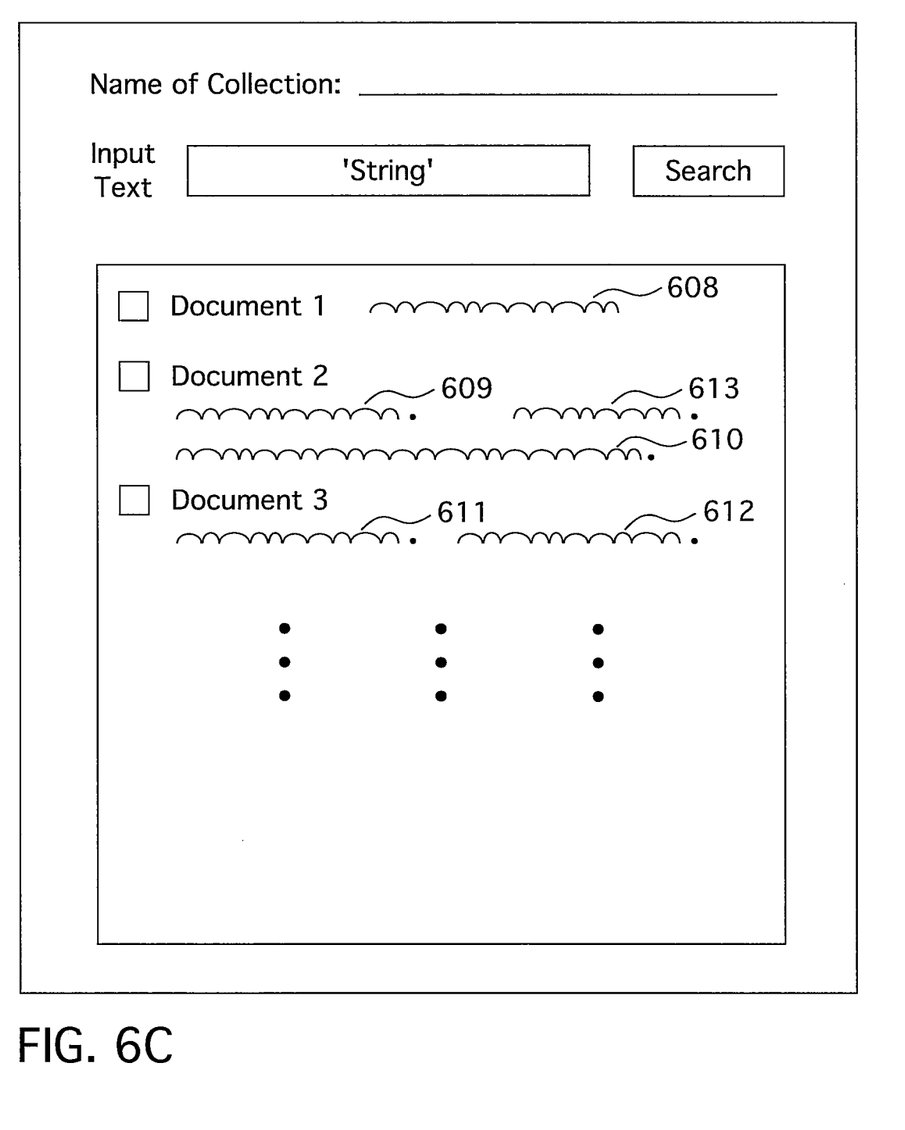
FIG. 6C shows an example of a screen depicting how a user can navigate through a text and other information.

One non-limiting illustration is shown in FIGS. 6a-6c. At the top of the page is a text input box and a search button, FIG. 6a. Below the text input box is a list of the collection of documents the user has selected. Observe that initially, the input box 601 is clear, and there are no sentences on the page, only meta data (document title, author, data, . . . ) on each document 602, 603, 604, 605 in the collection.

FIG. 6b shows the input text 'string' in the input text box 606. After the user clicks the 'search' button 607, the resulting data elements are retrieved and displayed under the corresponding source documents. Notice that there was a data element 608 matched from the first document. This means that the first document contained one instance of the string 'string.' Two data elements 609 and 610 from different parts of the second document are retrieved meaning that two instances of 'string' were found. Two consecutive data elements 611 and 612 were retrieved from the third document. FIG. 6(b) shows one instance of the target, which represents information that is sought. The target may be an input string, although it will be appreciated that the target may be obtained by various means, generated by or in connection with server operations either based on user input or automatically, and so on.

We refer to the results retrieved and displayed after a search query as the 'entry points'.

What is shown is only one way to display the results; one has several options. For instance, the documents that do not have a matching sentence may be listed together at the bottom of the page.

Retrieving Context for Matching Results

FIG. 6c illustrates how context is retrieved seamlessly. The results of clicking sentence 609 in FIG. 6b retrieve the immediately following sentence 613 with the result shown in FIG. 6c. Clearly, sentence 613 adds context to sentence 609. Sentence 609 in turn can be clicked and the following sentence can be retrieved and displayed. The process can be repeated and allow context to be included seamlessly, as needed, around any of the displayed sentences.

There are multiple options as to where the clickable area or buttons should be. One option could be the entire second half portion of a displayed sentence for retrieving immediately following sentences; and, the first half portion of a displayed sentence for retrieving immediately preceding sentences. Alternatively, one can introduce small icons to the right of each sentence, one for next and another for previous sentences; the icons may be visible only when the mouse is hovering in the displayed target sentence. JavaScript may be used to accomplish these objectives.

Similarly, by double clicking a sentence we can eliminate it. Alternatively, we can introduce a specific 'delete' icon to the right of the target sentence. Where the icons or the triggering area should be located is highly customizable.

Figure 7:
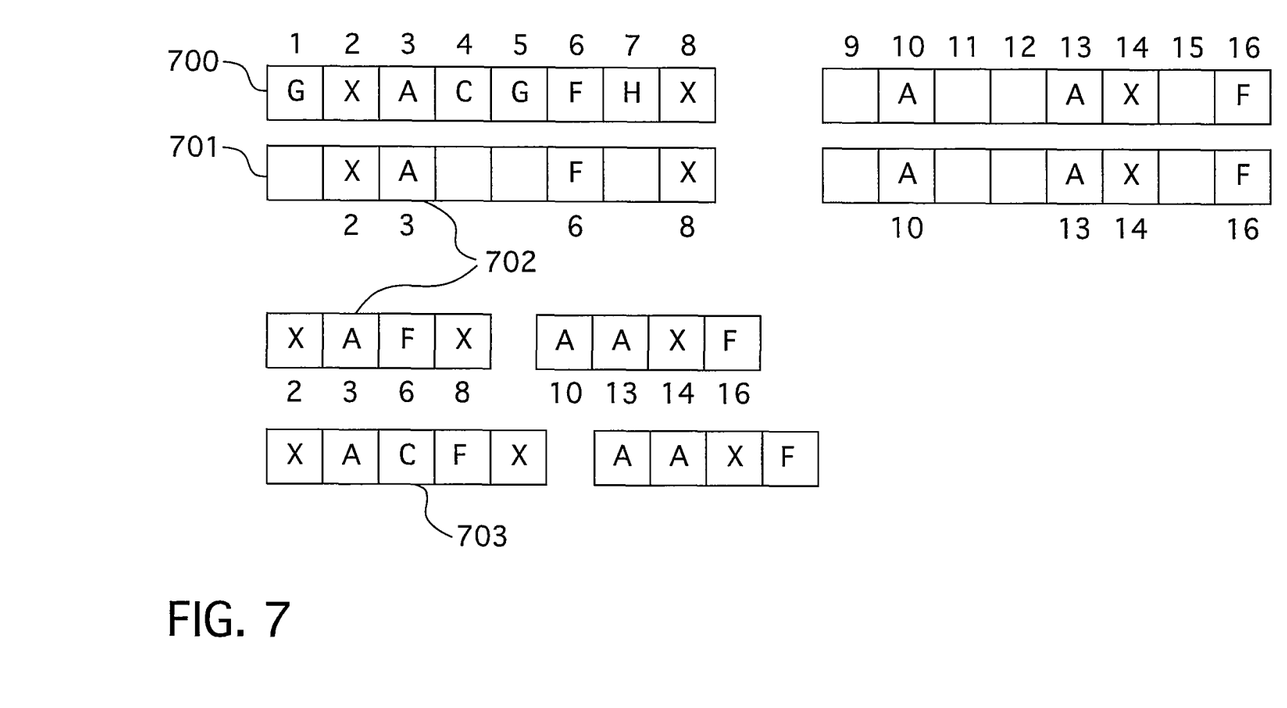
FIG. 7 shows an example of the Next operator by which a base subsequence can be navigated.

FIG. 7 shows in more detail how the "Next Operator" can act to expand the terms in the subsequence.

The "Next/Previous operator" is described with respect to Next operation. (As one of skill will recognize, the same can be done with the Previous operation.) The Next operator takes two inputs: a subsequence, e.g., 701, and any one of the sub-sequence's terms, e.g., 702. The Next operation inserts the term C 703 which is the term next to A 702 in the original sequence 700.

Since each sentence is sequentially ordered reflecting its relative position in the original source document, when the displayed sentence is clicked the system knows which sentences to retrieve. If the index number of the displayed sentence is k, the Next operator retrieves the sentence index k+1; similarly the Previous operator retrieves the k−1 sentence. We can similarly define a "Delete" operator, which takes any displayed term (sentence) and deletes it from the display.

The configuration of data elements can be represented on a display, for navigation by a user. As the artisan will appreciate, the display can be implemented by a conventional computer monitor or other monitor, or by another apparatus permitting display such as a handheld device, although other display options are possible. There may be one, or multiple, entities that process and/or store the information that is displayable. The display may be implemented by a display apparatus connected, physically or logically, to these processing and/or storage entities. By way of non-limiting example, the method and system of the present invention may be carried out by a "client/server"-type architecture, where the flow of information goes from a server computer or computers to a client computer or computers. The user for whom the display features of the present invention are implemented may be located at the client side or the server side, or at another node in electronic connection with the client or server side.

In the preceding specification the present invention has been described with reference to specific example embodiments thereof. It will, however, be evident that various modifications and changes may be made without departing from the broader spirit and scope of the present invention as set forth in the claims that follow. The specification and drawings are accordingly to be regarded in an illustrative rather than restrictive sense.

I claim:

1. A system for configuring relationships among data elements of a textual source, the data elements stored in a non-transitory computer-readable medium, comprising:
   a processor, and a computer memory in communication with said processor, wherein the processor is programmed to:
   identify one or more subunits of said textual source, wherein said one or more subunits correspond to, respectively, one or more sentences, and store said subunits in a computer memory;
   index said subunits to form a sequence, said sequence comprised of one or more terms, and store said sequence in said computer memory wherein said sequence preserves said one or more terms in an order determined by said corresponding subunits in said textual source;
   identify, based on a search query, a base subsequence of said sequence, said base subsequence comprised of one or more terms of said sequence, said base subsequence preserving the order of said subsequence, wherein each of said one or more terms of said base subsequence contains said search query; and
   store said base subsequence in said computer memory in such a manner that said base subsequence is structured for expansion by adding one or more terms from said sequence wherein each of said one or more added terms from said sequence does not contain said search query.

2. A computer-implemented method for configuring relationships among data elements of a textual source, the data elements stored in a non-transitory computer-readable medium, the method comprising:
   identifying one or more subunits of said textual source, wherein said one or more subunits correspond to, respectively, one or more data elements, and storing said subunits in a computer memory;
   indexing said subunits to form a sequence, said sequence comprised of one or more terms, and storing said sequence in said computer memory wherein said sequence preserves said one or more terms in an order determined by said corresponding subunits in said textual source;
   identifying, based on a search query, a base subsequence of said sequence, said base subsequence comprised of one or more terms of said sequence, said base subsequence preserving the order of said subsequence, wherein each of said one or more terms of said base subsequence contains said search query; and
   storing said base subsequence in said computer memory in such a manner that said base subsequence is structured for expansion by adding one or more terms from said sequence wherein each of said one or more added terms from said sequence does not contain said search query.

3. The computer-implemented method of claim 2, wherein said one or more subunits correspond to, respectively, one or more subtitles.

4. The computer-implemented method of claim 2, wherein said one or more subunits correspond to, respectively, one or more captions.

5. The computer-implemented method of claim 2, wherein said one or more subunits correspond to, respectively, one or more charts.

6. The computer-implemented method of claim 2, wherein said one or more subunits correspond to, respectively, one or more figures.

7. A non-transitory computer-readable medium storing executable program instructions for causing a device having a processor to:
   identify one or more subunits of said textual source, wherein said one or more subunits correspond to, respectively, one or more data elements, and store said subunits in a computer memory;
   index said subunits to form a sequence, said sequence comprised of one or more terms, and store said sequence in said computer memory wherein said sequence preserves said one or more terms in an order determined by said corresponding subunits in said textual source;
   identify, based on a search query, a base subsequence of said sequence, said base subsequence comprised of one or more terms of said sequence, said base subsequence preserving the order of said subsequence, wherein each of said one or more terms of said base subsequence contains said search query; and
   store said base subsequence in said computer memory in such a manner that said base subsequence is structured for expansion by adding one or more terms from said sequence wherein each of said one or more added terms from said sequence does not contain said search query.

* * * * *